(12) United States Patent
Suzuki

(10) Patent No.: US 11,137,055 B2
(45) Date of Patent: Oct. 5, 2021

(54) DRIVE APPARATUS

(71) Applicant: AISIN SEIKI KABUSHIKI KAISHA, Kariya (JP)

(72) Inventor: Shintaro Suzuki, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/089,013

(22) Filed: Nov. 4, 2020

(65) Prior Publication Data

US 2021/0131537 A1     May 6, 2021

(30) Foreign Application Priority Data

Nov. 5, 2019    (JP) .............................. JP2019-200469

(51) Int. Cl.
    *F16H 25/20*      (2006.01)

(52) U.S. Cl.
     CPC ...... *F16H 25/20* (2013.01); *F16H 2025/2075* (2013.01)

(58) Field of Classification Search
     CPC .......................... F16H 25/20; F16H 2025/2075
     See application file for complete search history.

(56) References Cited

U.S. PATENT DOCUMENTS

| | | | |
|---|---|---|---|
| 4,496,086 A | 1/1985 | Duchadeau | |
| 5,672,011 A * | 9/1997 | Eder | F16C 29/0607 384/45 |
| 5,970,812 A | 10/1999 | Fan et al. | |
| 6,174,086 B1 * | 1/2001 | Ng | F16C 29/004 384/45 |
| 6,939,044 B1 * | 9/2005 | Lyon | F16C 29/06 384/45 |
| 7,213,971 B2 * | 5/2007 | Dorn | F16C 29/0609 384/45 |
| 7,217,034 B2 * | 5/2007 | Moshammer | F16C 29/02 384/38 |
| 7,387,441 B2 * | 6/2008 | Ubukata | F16C 29/0609 384/13 |
| 7,611,285 B2 * | 11/2009 | Rudy | F16C 29/0659 384/43 |

(Continued)

FOREIGN PATENT DOCUMENTS

| | | |
|---|---|---|
| JP | S5746519 U | 3/1982 |
| JP | S5817005 A | 2/1983 |

(Continued)

*Primary Examiner* — David M Fenstermacher
(74) *Attorney, Agent, or Firm* — Buchanan Ingersoll & Rooney PC

(57) ABSTRACT

A drive apparatus includes a rail, a shaft, and a motion body. At least a part of the rail is curved such that an opening groove of the rail is curved when the rail is seen from a side orthogonal to an axial direction. The shaft includes flexibility. The shaft includes an engagement portion which is formed in a spiral shape at a circumferential surface thereof. The motion body includes a case portion and an engaged portion held by the case portion so as to be movable, the engaged portion extending inside the rail through the opening groove from an outward of the rail, the engaged portion engaged with the engagement portion of the shaft. The engaged portion is movable in a first direction, and includes an orientation fixed relative to the case portion in a second direction which is orthogonal to the first direction.

19 Claims, 8 Drawing Sheets

(56) References Cited

U.S. PATENT DOCUMENTS

| | | | | |
|---|---|---|---|---|
| 7,832,932 | B2* | 11/2010 | Haub | F16C 29/0642 |
| | | | | 384/45 |
| 7,845,853 | B2* | 12/2010 | Rudy | F16C 29/005 |
| | | | | 384/12 |
| 7,950,853 | B2* | 5/2011 | Mueller | F16C 29/0669 |
| | | | | 384/44 |
| 8,057,099 | B2* | 11/2011 | Pfeuffer | F16C 29/0609 |
| | | | | 384/44 |
| 8,177,432 | B2* | 5/2012 | Klein | F16C 29/065 |
| | | | | 384/44 |
| 9,428,347 | B2* | 8/2016 | Kleinikkink | B65G 54/02 |
| 9,803,688 | B2* | 10/2017 | Yamagishi | F16C 29/0611 |
| 10,670,079 | B2* | 6/2020 | Kleinikkink | H02K 41/031 |
| 2008/0141804 | A1 | 6/2008 | Maffeis et al. | |
| 2013/0126497 | A1* | 5/2013 | Miller | B23K 37/0294 |
| | | | | 219/125.11 |
| 2015/0023622 | A1* | 1/2015 | Yoshizaki | F16C 33/6633 |
| | | | | 384/462 |
| 2015/0078687 | A1* | 3/2015 | Yoshizaki | C10M 115/08 |
| | | | | 384/13 |

FOREIGN PATENT DOCUMENTS

| | | |
|---|---|---|
| JP | H10504374 A | 4/1998 |
| JP | 2001200905 A | 7/2001 |
| JP | 2008151338 A | 7/2008 |

* cited by examiner

DRIVE APPARATUS

CROSS REFERENCE TO RELATED APPLICATIONS

This application is based on and claims priority under 35 U.S.C. § 119 to Japanese Patent Application 2019-200469, filed on Nov. 5, 2019, the entire content of which is incorporated herein by reference.

TECHNICAL FIELD

This disclosure generally relates to a drive apparatus.

BACKGROUND DISCUSSION

A known configuration of a drive apparatus is disclosed in JP2008-151338A (hereinafter referred to as Patent reference 1). The drive apparatus disclosed in Patent reference 1 is an apparatus for changing rotary motion to rectilinear motion. The drive apparatus includes a rotating screw and a translating nut screw. The rotating screw includes a trapezoidal thread. The translating nut screw includes a through bore into which the rotating screw is inserted. The translating nut screw includes a pair of driving teeth radially oriented toward the nut screw. Each of the driving teeth includes a conical pedestal which is engaged with one surface of a screw thread of the screw. The rotating screw rotates in one direction and is engaged with the thread portion at a surface of a side where the thread portion translates the nut screw in one direction. The rotating screw rotates in the other direction and is engaged with the thread portion at a surface of a side where the thread portion translates the nut screw in the other direction. Each of the driving teeth of the drive apparatus is held within the translating nut screw by rotating about an axis thereof, and is applied with a preload axially so as to be constantly engaged with the thread portion of the translating nut screw.

The translating nut screw of the drive apparatus disclosed in Patent reference 1 move rectilinearly by the rotary motion of the rotating screw serving as a shaft. However, the orientation or position of the driving teeth of the drive apparatus is displaced radially relative to the rotating screw in a case where the rotating screw is curved. As a result, the conical pedestal of the driving teeth may not be engaged with the thread of the screw. As such, according to the drive apparatus of the Patent reference 1, the translating nut screw serving as a motion body may not smoothly move curvilinearly along the axial direction of the rotating screw even in a case where the screw is formed to be curved.

A need thus exists for a drive apparatus which is not susceptible to the drawback mentioned above.

SUMMARY

According to an aspect of the disclosure, a drive apparatus includes a rail formed in a tubular shape, the rail including an opening groove which is provided along an axial direction thereof, a shaft arranged inside and along the rail, the shaft rotatable in a circumferential direction thereof, and a motion body attached to the rail, the motion body movable along the axial direction by the rotation of the shaft. At least a part of the rail is curved such that the opening groove is curved when the rail is seen from a side orthogonal to the axial direction. The shaft includes flexibility. The shaft includes an engagement portion which is formed in a spiral shape at a circumferential surface thereof. The motion body includes a case portion arranged at an outward of the rail, and an engaged portion held by the case portion so as to be movable, extending inside the rail through the opening groove from the outward of the rail, and engaged with the engagement portion of the shaft. The engaged portion is movable in a first direction corresponding to a direction along the engagement portion when seen from the side, and includes an orientation fixed relative to the case portion in a second direction which is orthogonal to the first direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
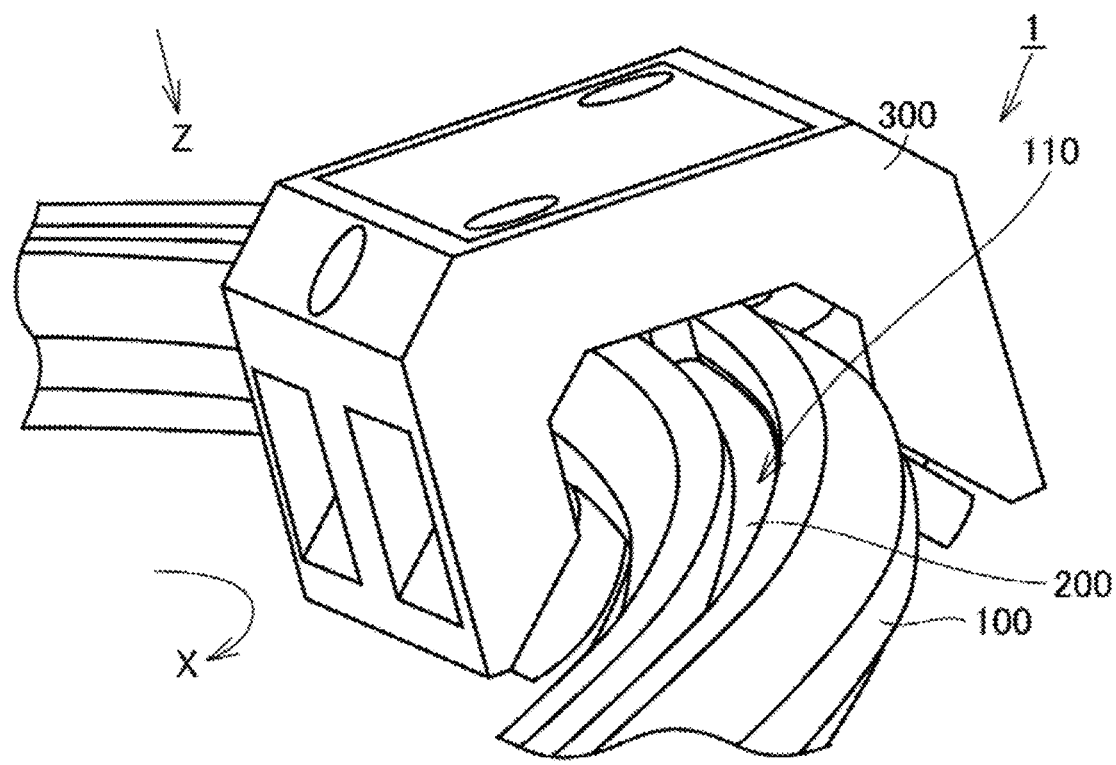
FIG. 1 is a perspective view of a part of a drive apparatus of an embodiment disclosed here.

A drive apparatus of an embodiment of a disclosure will hereinafter be explained with reference to the drawings. The same components or the corresponding components are marked with the same reference numerals, and the description of the components will not be repeated.

Figure 2:
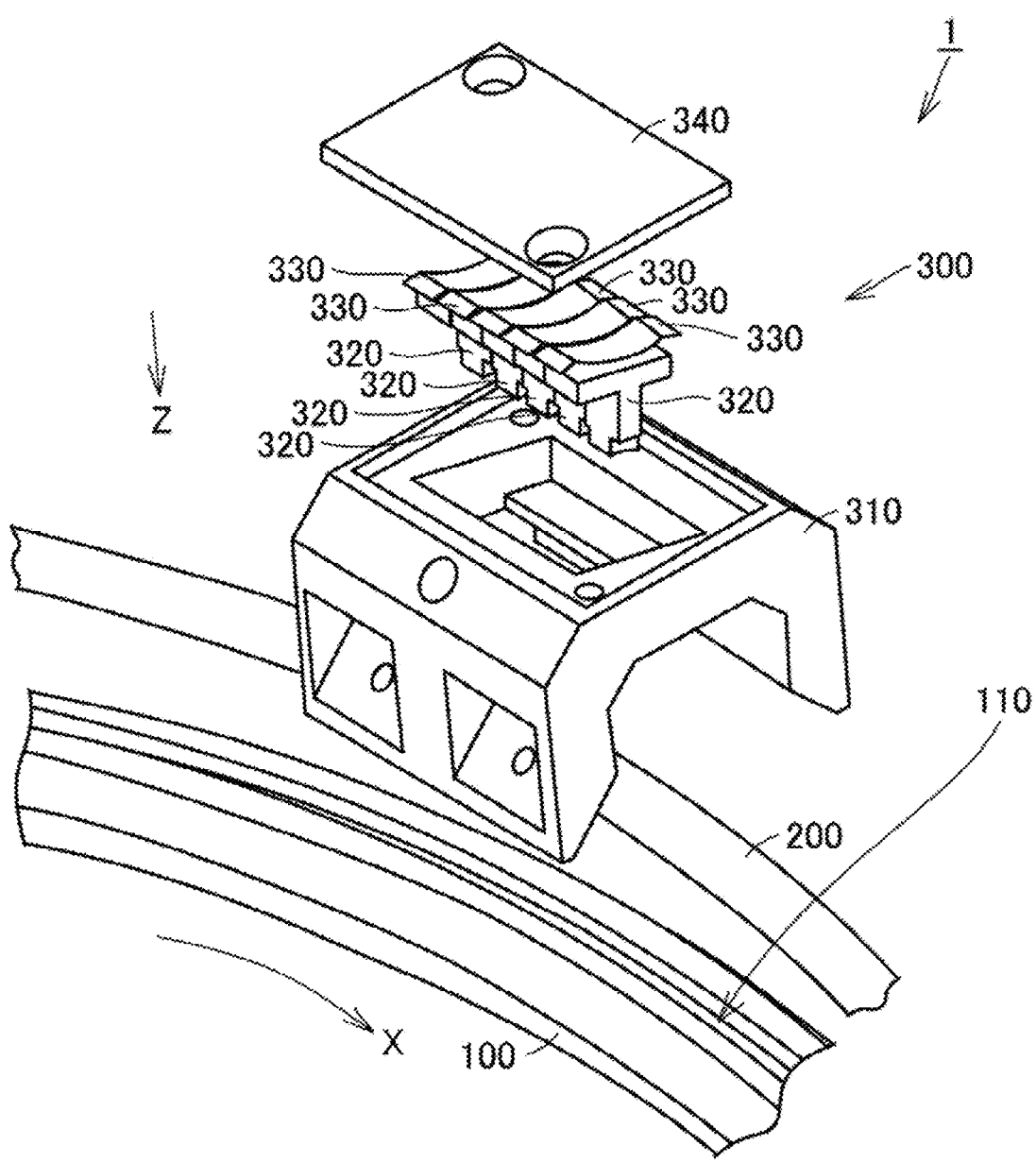
FIG. 2 is an exploded perspective view of the part of the drive apparatus of the embodiment.
Figure 3:
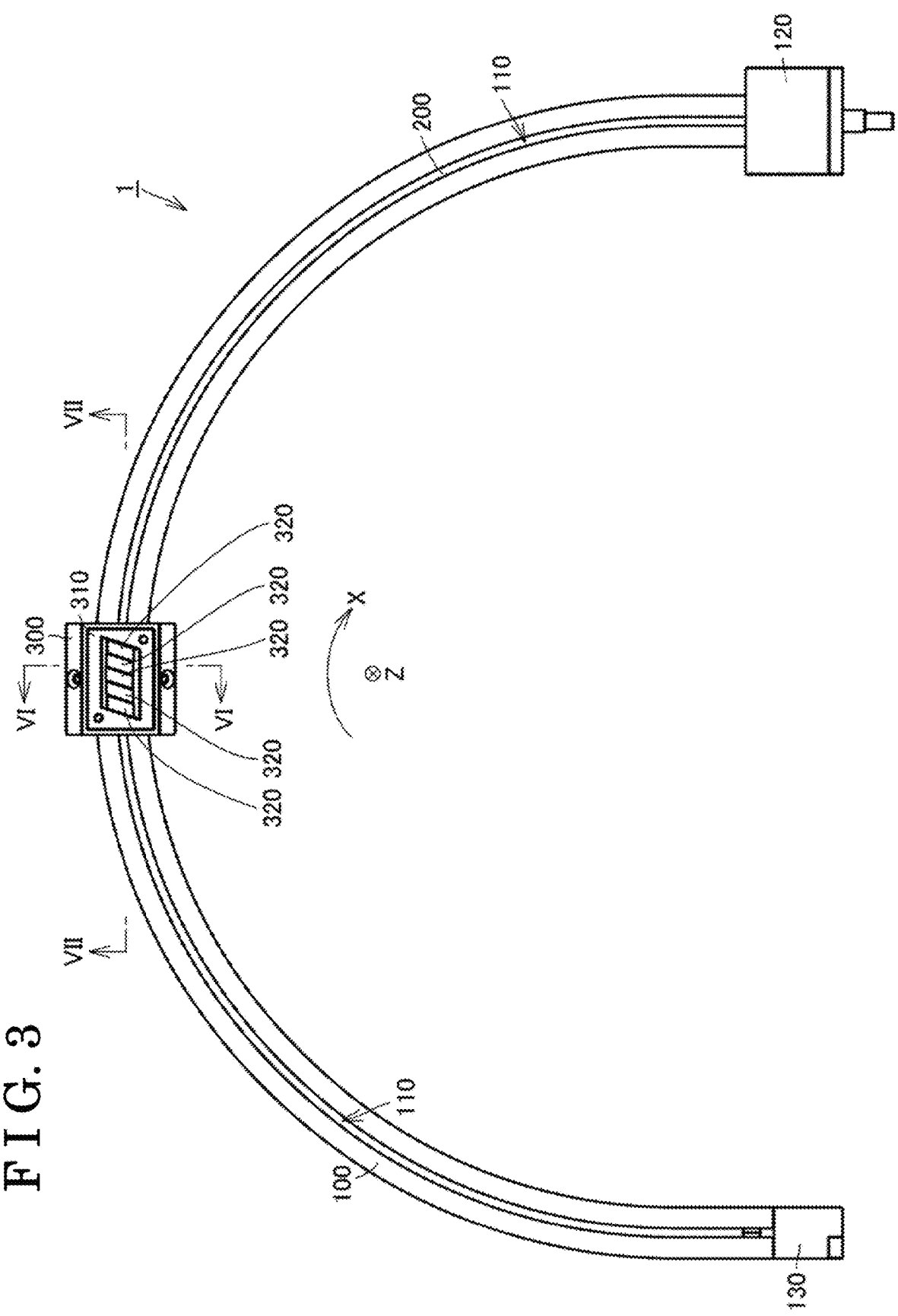
FIG. 3 is a plan view of the whole structure of the drive apparatus of the embodiment.

As illustrated in FIGS. 1 to 3, a drive apparatus 1 of the embodiment includes a rail 100, a shaft 200, and a motion body 300.

As shown in FIGS. 1 to 3, the rail 100 is formed in a tubular shape, and includes an opening groove 11 along an axial direction X. As shown in FIG. 3, at least a part of the rail 100 is curved such that an opening groove 110 is curved when seen from a side Z which is orthogonal to the axial direction X. In the embodiment, the whole of the rail 100 is curved such that the opening groove 110 is curved when seen from the side Z. At least a part of the rail 100 is curved when seen in the axial direction X and in a direction orthogonal to the side Z. That is, the rail 100 is curved three dimensionally.

Figure 4:
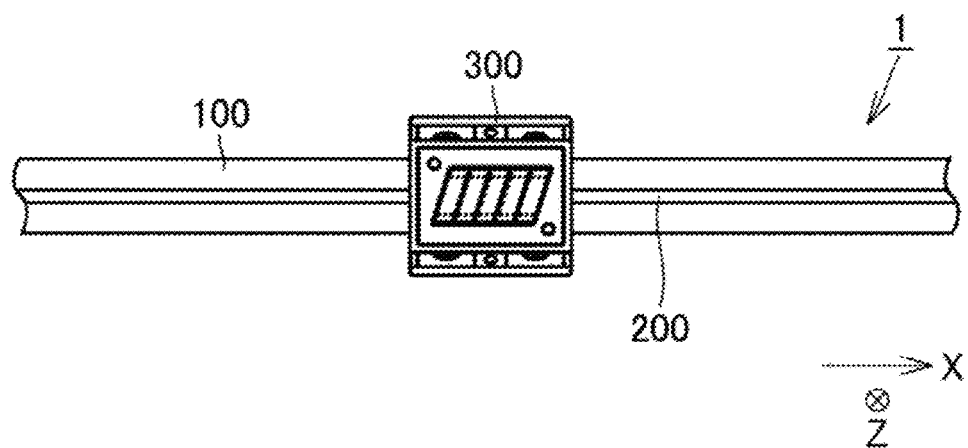
FIG. 4 is a plan view illustrating a part of a drive apparatus of a modified example of the embodiment.

As shown in FIG. 4, the part of the rail 100 may be formed in a linear shape.

As shown in FIGS. 1 to 3, the shaft 200 is arranged inside the rail 100 and along therewith.

Figure 5:
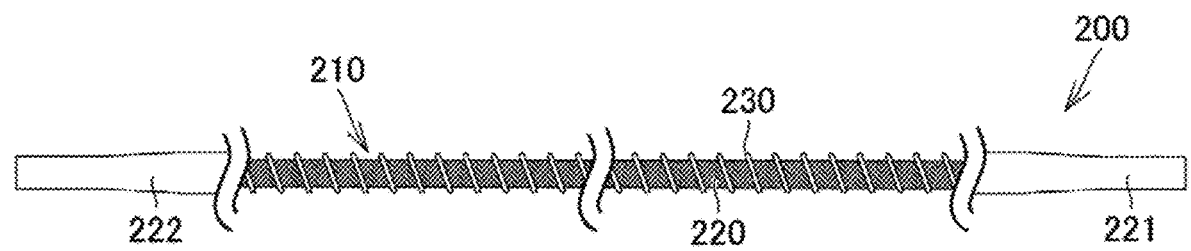
FIG. 5 is a plan view illustrating the configuration of a shaft of the drive apparatus of the embodiment.

As shown in FIG. 5, in a case where the mechanical force is not applied to the shaft 200, the shaft 200 is formed in a linear shape. The shaft 200 includes flexibility. The shaft 200 is arranged inside and along the rail 100 while being in contact with a part of an inner wall thereof.

The shaft 200 includes an engagement portion 210 which is formed spirally at the circumferential surface of the shaft 200. To be specific, the engagement portion 210 of the embodiment is a groove portion. The shaft 200 includes an axial shaft 220, and a wire 230 wounded spirally about the axial shaft 220. The engagement portion 210 or the groove portion is a part between the wires 230 which are arranged next to each other in the axial direction of the axial shaft 220.

The axial shaft 220 includes a first end portion 221 in the axial direction of the axial shaft 220, and a second end portion 222 which is arranged opposite to the first end portion 221.

As shown in FIGS. 3 and 5, the first end portion 221 of the axial shaft 220 is arranged inside the rail 100 and attached to or assembled on a motor 120 which is arranged at a first end of the rail 100 in the axial direction X. The motor 120 rotates the axial shaft 220 in both direction of a circumferential direction thereof. As such, the shaft 200 rotates in the circumferential direction. The shaft 200 includes flexibility and rotates while being contact with the part of the inner wall of the rail 100 and maintaining the axial shaft 220 in the curved axial direction.

The second end portion 222 of the axial shaft 220 is biased in the axial direction of the axial shaft 220 by a biasing end portion 130 which is arranged at the other end of the rail 100 in the axial direction X. Accordingly, in a case where the shaft 200 deforms by the rotation of the shaft 200 and changes the orientation relative to the rail 100, the first end portion 221 may be retained to be attached to or assembled on the motor 120. The axial shaft 220 is fixed to the biasing end portion 130 in the radial direction of the axial shaft 220.

As shown in FIGS. 1 to 3, the motion body 300 is assembled on the rail 100. As shown in FIG. 2, the motion body 300 includes a case portion 310, plural engaged portions 320, plural biasing members 330, and a lid portion 340. The biasing members 330 and the lid portion 340 are not illustrated in FIG. 3, and the lid portion 340 is not illustrated in FIG. 4.

Figure 6:
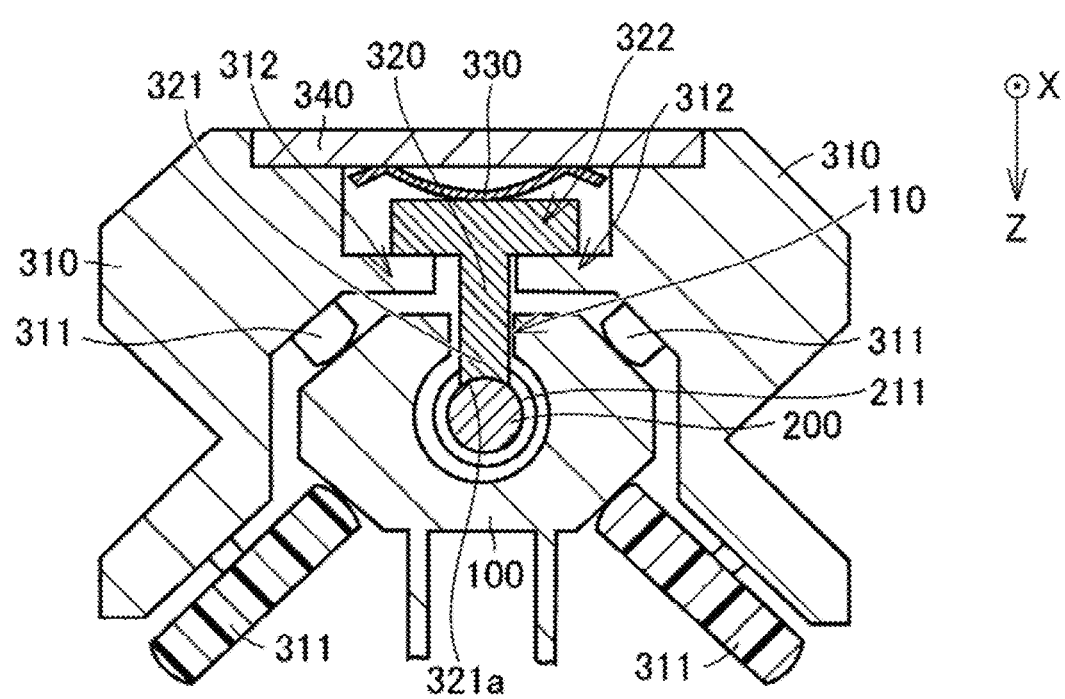
FIG. 6 is a cross sectional view of the drive apparatus taken along a line VI-VI in FIG. 3 when seen in an arrow direction.
Figure 7:
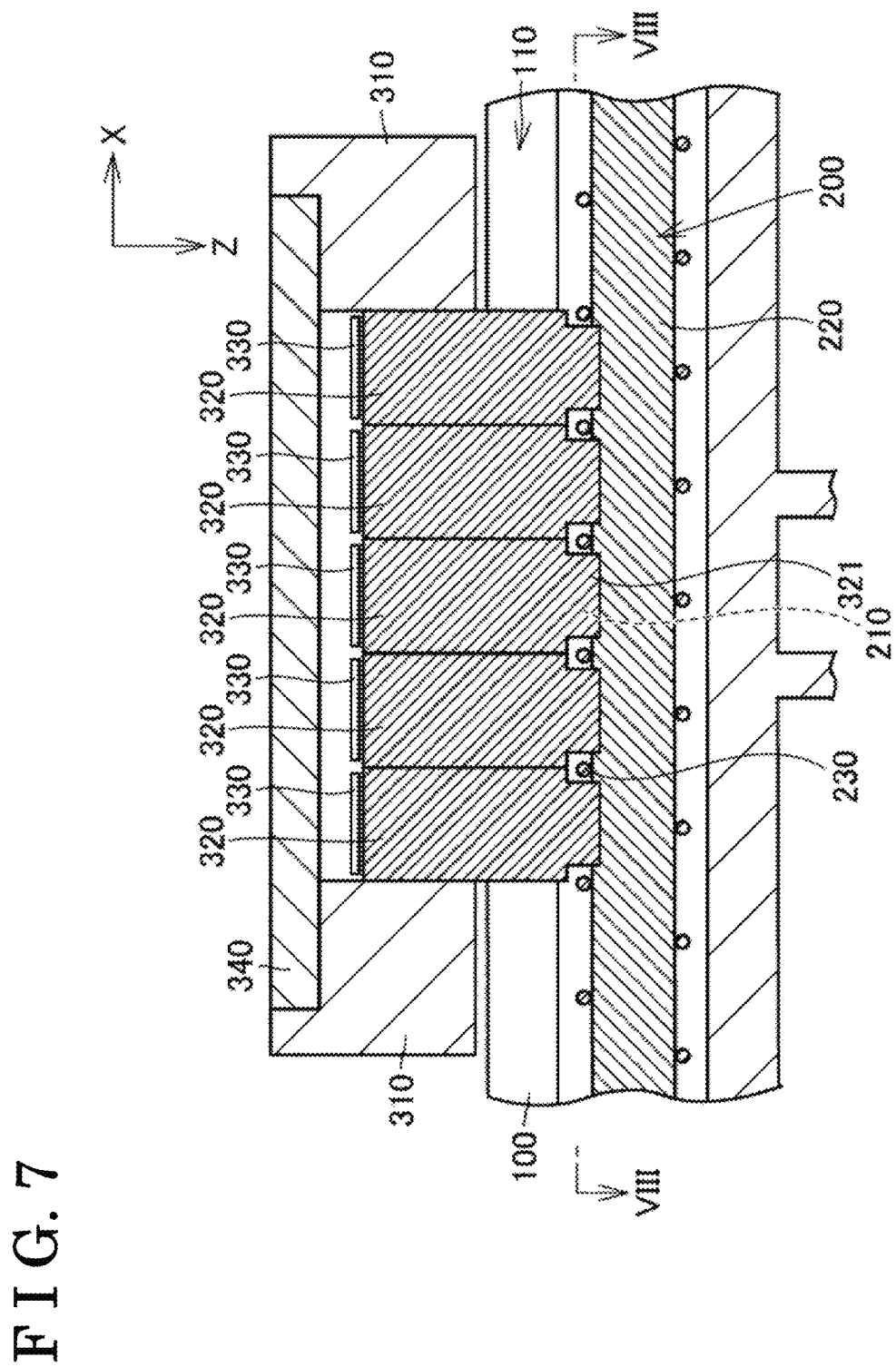
FIG. 7 is a cross sectional view of the drive apparatus taken along a line VII-VII in FIG. 3 when seen in an arrow direction.

As shown in FIGS. 6 and 7, the case portion 310 is arranged outward of the rail 100. The case portion 310 includes plural rollers 311 and a holding arm 312. Each of the rollers 311 is arranged so as to be slidably in contact with the outer surface of the rail 100.

As shown in FIGS. 6 and 7, the engaged portion 320 extends from outward of the rail 100 to inside thereof through the opening groove 110. The engaged portion 320 engages with the engagement portion 210 of the shaft 200, the engagement portion 210 serving as a groove portion.

Figure 8:
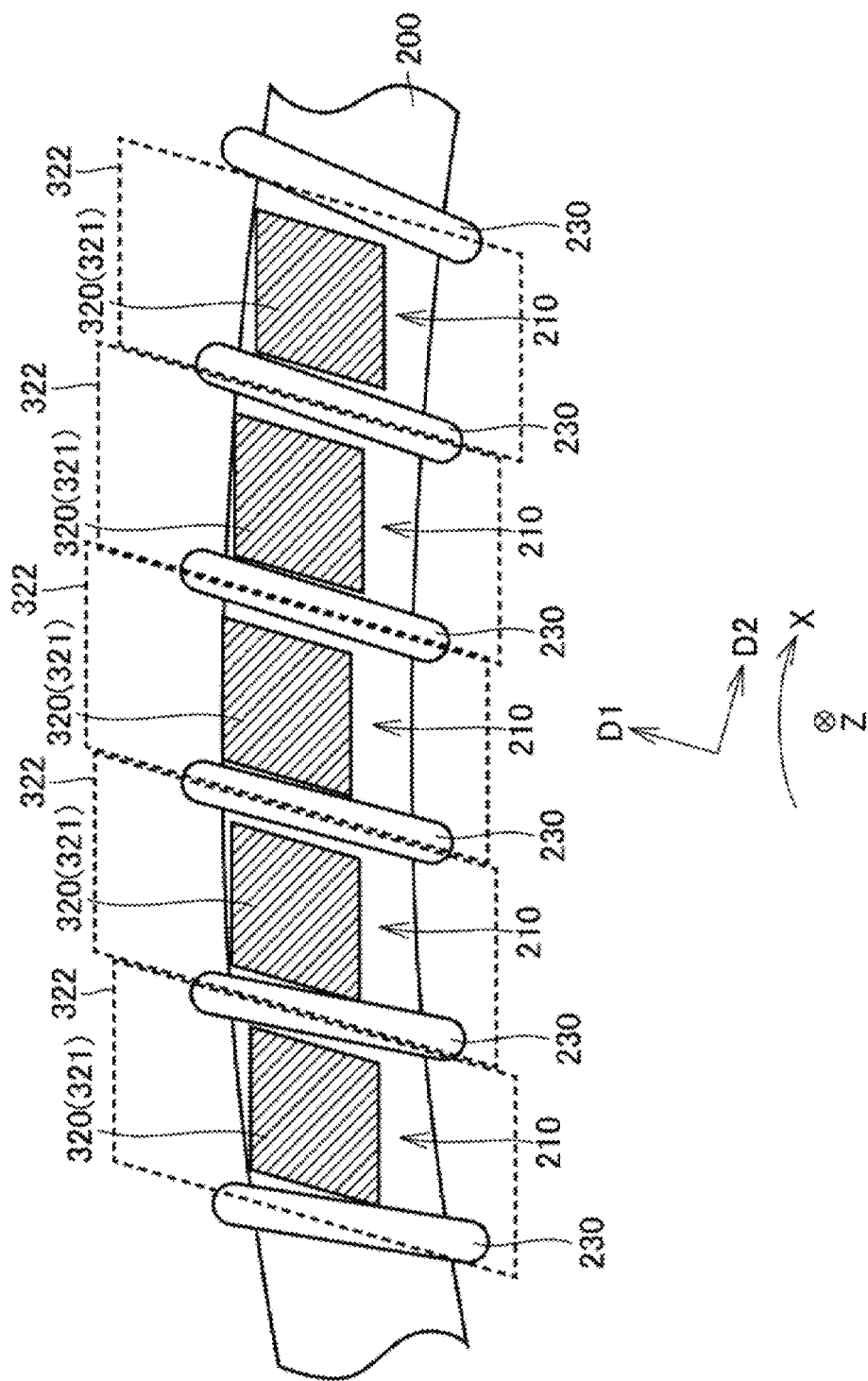
FIG. 8 is a cross sectional view of the drive apparatus taken along a line VIII-VIII in FIG. 7 when seen in an arrow direction.

The engaged portion 320 includes an end part 321 and a head part 322. The end part 321 is arranged inside the groove portion 210. As shown in FIG. 8, the width of the end part 321 in a second direction D2 orthogonal to a first direction D1 serving as a direction along the engagement portion 210, that is, the groove portion, is narrower than the width of the engagement portion 210, that is, the groove portion, in the second direction D2 in a state where the shaft 200 is curved maximally. The first direction D1 and the second direction D2 shown in FIG. 8 show a first direction and a second direction on the basis of a center point of the end part 321 of the end part 321 of the engaged portion 320 arranged at a center of the plural engaged portions 320.

As shown in FIG. 6, the end part 321 includes a sliding surface 321a which is slidably in contact with a bottom surface 211 of the engagement portion 210 of the shaft 200, that is, the groove portion. The sliding surface 321a is curved along the bottom surface 211 of the engagement portion 210, that is, the groove portion, in the circumferential direction of the shaft 200.

The head part 322 is arranged opposite to the shaft 200. As shown in FIG. 8, the head part 322 extends in the opposite directions of the engaged portion 320 along the first direction D1 from the center thereof.

Here, the holding arm 312 of the case portion 310 will be explained. As shown in FIG. 6, the holding arm 312 is arranged closer to the rail 100 than the head part 322. He holding arm 312 holds the head part 322. Specifically, a surface of the head part 322, the surface arranged close to the holding arm 312, is slidably in contact with a surface of the holding arm 312, the surface close to the head part 322. Accordingly, as shown in FIG. 8, the head part 322 is movable along the first direction D1.

As such, the engaged portions 320 are movable in the first direction D1 serving as a direction along the engagement portion 210 when seen from the side Z. The engaged portions 320 are movably held by the case portion 310. As shown in FIGS. 3 and 8, the orientation or position of the engaged portion 320 is fixed relative to the case portion 310 in the second direction D2 when seen from the side Z. The plural engaged portions 320 are arranged adjacent to each other in the second direction D2 and are slidable in the first direction D1. The two engaged portions 320 arranged at the outermost positions in the aligned direction of the plural engaged portions 320 are slidable relative to the case portion 310, and are fixed by the engaged portions 320 arranged adjacent thereto and the case portion 310 in the second direction D2.

Figure 9:
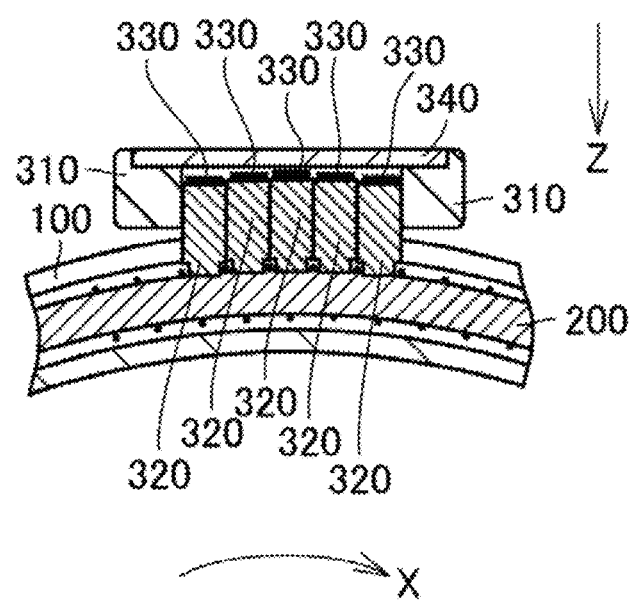
FIG. 9 is a cross sectional view of the drive apparatus of the embodiment showing a state where a motion body is oriented at a part where a rail is curved when seen in directions orthogonal to an axial direction and a side.

As shown in FIG. 6, the biasing member 330 is arranged opposite to the rail 100 relative to the head part 322. As shown in FIGS. 2 and 6, the biasing portion 330 is a plate spring having a center part which is curved to be protruding toward the engaged portion 320. FIG. 9 is a cross-sectional view of the drive apparatus 1 which is seen the same as the cross-sectional view of the motion body 300 in FIG. 7. As shown in FIG. 9, the biasing members 330 press or bias the engaged portions 320 toward the shaft 200. Each of the plural biasing members 330 is arranged so as to correspond to each of the plural engaged portions 320 respectively.

As shown in FIG. 6, the lid portion 340 is fixed to the case portion 310. The lid portion 340 is in contact with the biasing members 330. The lid portion 340 is arranged opposite to the engaged portions 320 relative to the biasing members 330. The engaged portions 320 move opposite to the biasing direction of the biasing members 330 along the side Z, that is, opposite to the shaft 200.

The mechanism of the drive apparatus 1 when the shaft 200 rotates will hereunder be explained. As shown in FIG. 7, the shaft 200 moves in one direction of the rotating direction, and a part of the wire 230 spirally wound about the shaft 220 moves along the shaft direction X, the part arranged at the side of the opening groove 110. Accordingly, a part of the engagement portion 210 serving as the groove portion arranged at the side of the opening groove 110 moves along the X direction. A surface of the wire 230 moving along the axial direction X, the surface arranged in a moving direction, pushes at least one of the end part 321 of the engaged portion 320 along the axial direction X. As such, the plural engaged portions 320 engaged with the engagement portions 210 are pushed along the axial direction X. As a result, the motion body 300 moves along the axial direction.

As shown in FIG. 8, in a case where the shaft 200 is curved when seen from the side Z, each of the plural engaged portions 320 moves along the first direction D1 instead of the second direction D2 so as to match or adjust the orientation or position of the shaft 200 curved inside the motion body 300. That is, each of the plural engaged portions 320 moves while maintaining the engagement with respect to the engagement portion 210. As such, even in a case where the shaft 200 is curved in accordance with the curving of the rail 100, the motion body 300 smoothly moves along the axial direction X by the rotation of the shaft 200.

As shown in FIG. 9, in a case where the shaft 200 is curved when seen in the directions orthogonal to the axial direction X and the side Z, each of the engaged portions 320 moves along the side Z so as to match or adjust the orientation or position of the shaft 200 inside the motion body 300. Each of the plural engaged portions 320 move by being pressed by the biasing member 330 while being engaged with the engagement portion 210. As such the motion body 300 smoothly moves along the axial direction X by the rotation of the shaft 200 even the shaft 200 is curved in accordance with the curvature of the rail 100.

Accordingly, the motion body 300 moves along the axial direction X by the rotation of the shaft 200 even the rail 100 is curved three-dimensionally.

As described above, the drive apparatus 1 of the embodiment includes the rail 100, the shaft 200, and the motion body 300. The rail 100 is in a tubular shape and includes the opening groove 110 along the axial direction X. At least a part of the rail 100 is curved such that the opening groove 100 is curved when the rail 100 is seen from the side Z orthogonal to the axial direction X. The shaft 200 is arranged inside and along the rail 100. The shaft 200 rotates in the circumferential direction. The shaft 200 includes the flexibility. The shaft 200 includes the engagement portion 210 which is formed in a spiral shape on the circumferential surface of the shaft 200. The motion body 300 is attached to or assembled on the rail 100. The motion body 300 moves along the axial direction X by the rotation of the shaft 200. The motion body 300 includes the case portion 310 and the engaged portions 320. The case portion 310 is arranged at an outward of the rail 100. The engaged portions 320 are movably retained by the case portion 310. The engaged portions 320 extend inside the rail 100 through the opening groove 110 from outward of the rail 100. The engaged portions 320 engage with the engagement portion 210 of the shaft 200. The engaged portions 320 move in the first direction D1 serving as the direction along the engagement portion 210 when seen from the side Z. The orientation of the engaged portion 320 relative to the case portion 310 is fixed in the second direction D2 which is orthogonal to the first direction D1 when seen from the side Z.

In the aforementioned configuration, the motion body 300 smoothly and curvilinearly moves by the rotation of the shaft 200.

The engagement portion 210 and the engaged portion 320 may be formed protrudingly and recessedly, respectively, or may be both formed protrudingly and recessedly so as to be engaged with each other.

In the aforementioned embodiment, the engagement portion 210 corresponds to a groove portion. The engaged portion 320 includes the end part 321 arranged inside the groove portion. The width of the end part 321 in the second direction D2 when seen from the side Z is narrower than the width of the groove portion in the second direction D2 in a state where the shaft 200 is curved maximally.

In the aforementioned embodiment, in a case where the motion body 300 moves at the most-curved part of the shaft 200 which is curved along the curve of the rail 100, a clearance is secured or provided between the groove portion and the end part 321 of the engagement portion 320 in the second direction D2. Furthermore, the motion body 300 moves further smoothly and curvilinearly.

In the aforementioned embodiment, the end part 321 includes the sliding surface 321a configured to slide on the bottom surface 211 of the engagement portion 210 of the shaft 200, that is, the groove portion. The sliding surface 321a is curved along the circumferential direction of the bottom surface 211 of the groove portion of the shaft 200.

In the aforementioned embodiment, the groove portion serving as the engagement portion 210 and the end part of the engaged portion 320 are favorably engaged with each other.

In the aforementioned embodiment, at least a part of the rail 100 is curved when seen from the directions orthogonal to the axial direction X and the side Z. The motion body 300 includes the biasing members 330 pressing the engaged portions 320 against the shaft 200.

In the aforementioned embodiment, even in a case where the rail 100 is curved within an in-plane directions of virtual planes which are parallel to the axial direction X and the side Z, respectively, the motion body 300 smooth moves. Furthermore, the motion body 300 smoothly moves three-dimensionally and curvilinearly by the rotation of the shaft 200.

In the aforementioned embodiment, the engaged portion 320 includes the head part 322 arranged outward thereof. The motion body 300 includes the biasing members 330 opposite to the rail 100 relative to the head parts 322. The case portion 310 includes the holding arm 312 holding the head part 322. The holding arm 312 is arranged closer to the rail 100 than the head part 322 is.

In the aforementioned configuration, even in a case where the engaged portion 320 moves in the first direction D1, the biasing direction of the biasing member 330 may be easily maintained so as to be forward the shaft 200.

In the aforementioned embodiment, the case portion 310 includes the plural rollers 311 sliding on the outer surface of the rail 100. In this configuration, the case 310 smoothly moves along the rail 100.

In the aforementioned embodiment, the motion body 300 includes the plural engaged portions 320 serving as the engaged portion 320. The plural engaged portions 320 are arranged adjacent to each other in the second direction D2 and are slidable in the first direction D1.

In the aforementioned embodiment, the strength of whole plural engaged portions 320 is improved by the reduction of the load applied to each of the engaged portions 320.

In the aforementioned embodiment, the drive apparatus 1 is applicable to any products. The drive apparatus 1 of the embodiment is applicable to products sliding components such as a sliding door, a movable roof and a vehicle seat of the vehicle, or to products rotating components such as a back door and a side door of the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A drive apparatus, comprising:
a rail formed in a tubular shape, the rail including an opening groove which is provided along an axial direction thereof;
a shaft arranged inside and along the rail, the shaft rotatable in a circumferential direction thereof; and
a motion body attached to the rail, the motion body movable along the axial direction by the rotation of the shaft; wherein
at least a part of the rail is curved such that the opening groove is curved when the rail is seen from a side orthogonal to the axial direction;
the shaft includes flexibility, the shaft includes an engagement portion which is formed in a spiral shape on a circumferential surface thereof;
the motion body includes
a case portion arranged at an outward of the rail; and
an engaged portion
  held by the case portion so as to be movable;
  extending inside the rail through the opening groove from the outward of the rail; and
  engaged with the engagement portion of the shaft; and
the engaged portion is movable in a first direction corresponding to a direction along the engagement portion when seen from the side, and includes an orientation fixed relative to the case portion in a second direction which is orthogonal to the first direction.

2. The drive apparatus according to claim 1, wherein
the engagement portion is a groove portion;
the engaged portion includes an end part arranged inside the groove portion; and
in a state where the shaft is curved maximally, a width of the end part in the second direction is narrower than a width of the groove portion in the second direction when seen from the side.

3. The drive apparatus according to claim 2, wherein the end part includes a sliding surface configured to slide on a bottom surface of the groove portion of the shaft, and the sliding surface is curved along the circumferential direction of the bottom surface of the groove portion of the shaft.

4. The drive apparatus according to claim 1, wherein at least a part of the rail is curved when seen from directions orthogonal to the axial direction and the side, and the motion body includes a biasing member pressing the engaged portion against the shaft.

5. The drive apparatus according to claim 2, wherein at least a part of the rail is curved when seen from directions orthogonal to the axial direction and the side, and the motion body includes a biasing member pressing the engaged portion against the shaft.

6. The drive apparatus according to claim 3, wherein at least a part of the rail is curved when seen from directions orthogonal to the axial direction and the side, and the motion body includes a biasing member pressing the engaged portion against the shaft.

7. The drive apparatus according to claim 4, wherein
the engaged portion includes a head part arranged opposite to the shaft;
the motion body includes the biasing member which is arranged opposite to the rail relative to the head part;
the case portion includes a holding arm holding the head part; and
the holding arm is arranged closer to the rail than the head part is.

8. The drive apparatus according to claim 5, wherein
the engaged portion includes a head part arranged opposite to the shaft;
the motion body includes the biasing member which is arranged opposite to the rail relative to the head part;
the case portion includes a holding arm holding the head part; and
the holding arm is arranged closer to the rail than the head part is.

9. The drive apparatus according to claim 6, wherein
the engaged portion includes a head part arranged opposite to the shaft;
the motion body includes the biasing member which is arranged opposite to the rail relative to the head part;
the case portion includes a holding arm holding the head part; and
the holding arm is arranged closer to the rail than the head part is.

10. The drive apparatus according to claim 1, wherein the case portion includes a plurality of rollers slidably in contact with an outer surface of the rail.

11. The drive apparatus according to claim 2, wherein the case portion includes a plurality of rollers slidably in contact with an outer surface of the rail.

12. The drive apparatus according to claim 3, wherein the case portion includes a plurality of rollers slidably in contact with an outer surface of the rail.

13. The drive apparatus according to claim 4, wherein the case portion includes a plurality of rollers slidably in contact with an outer surface of the rail.

14. The drive apparatus according to claim 5, wherein the case portion includes a plurality of rollers slidably in contact with an outer surface of the rail.

15. The drive apparatus according to claim 6, wherein the case portion includes a plurality of rollers slidably in contact with an outer surface of the rail.

16. The drive apparatus according to claim 7, wherein the case portion includes a plurality of rollers slidably in contact with an outer surface of the rail.

17. The drive apparatus according to claim 8, wherein the case portion includes a plurality of rollers slidably in contact with an outer surface of the rail.

18. The drive apparatus according to claim 9, wherein the case portion includes a plurality of rollers slidably in contact with an outer surface of the rail.

19. The drive apparatus according to claim 1, wherein the motion body includes a plurality of engaged portions serving as an engaged portion; and the plurality of engaged portions are arranged next to each other in the second direction, and are slidable in the first direction.

* * * * *